United States Patent [19]

Buchholz et al.

[11] 4,443,021

[45] Apr. 17, 1984

[54] APPARATUS FOR ADJUSTING TWO END POSITIONS LIMITING A CLAMPING STROKE

[75] Inventors: Albert Buchholz, Langenhagen; Werner Hesse, Wedemark; Günther Möller, Langenhagen, all of Fed. Rep. of Germany

[73] Assignee: Gildemeister AG, Bielefeld, Fed. Rep. of Germany

[21] Appl. No.: 232,305

[22] Filed: Feb. 6, 1981

[30] Foreign Application Priority Data

Feb. 11, 1980 [DE] Fed. Rep. of Germany ....... 3004988

[51] Int. Cl.³ .................... B23B 31/16; B23B 31/30
[52] U.S. Cl. .......................... 279/4; 279/111; 279/1 H
[58] Field of Search .................... 279/4, 1 H, 111; 409/80; 92/5 R; 91/1 R, 433

[56] References Cited

U.S. PATENT DOCUMENTS 3,473,098 10/1969 Waller .................................. 409/80

FOREIGN PATENT DOCUMENTS

1752593 9/1971 Fed. Rep. of Germany .......... 279/4

*Primary Examiner*—Z. R. Bilinsky
*Attorney, Agent, or Firm*—Owen, Wickersham & Erickson

[57] ABSTRACT

In a clamping unit, particularly in a chuck with exchangeable jaws, one terminal clamping position is reached during opening when the clamping jaws approach the limit of stability. The other end position is reached during closing when the jaws approach the point where they cannot be moved any further. However, both end positions must be so far removed from the rest position or the stop position that a residual clamping stroke remains which insures safe clamping even then in the terminal clamping positions. The terminal clamping positions are different for chucks of varying sizes, and so are the clamping strokes. To adjust the end positions as well as for determining the attainment of these end positions, an apparatus is provided comprising a transmitter device and a sensor device which reacts to approach or contact. Spacing is changeable with the adjustment of the clamping jaws. In order to prevent accidental erroneous adjustment, at least one specific part of the transmitter or sensor device is associated with each clamping unit and is changed with or made to function with its corresponding clamping unit.

3 Claims, 14 Drawing Figures

APPARATUS FOR ADJUSTING TWO END POSITIONS LIMITING A CLAMPING STROKE

The invention relates to an apparatus for adjusting the two terminal positions that limit a clamping stroke of the power-actuated chuck jaws of an exchangeable workpiece-clamping unit of a machine tool and for determining the attainment of the terminal positions. Such apparatus comprises a transmitter device and a sensor device sensitive to approach or contact of the transmitter and whose spacing is adjustable to correspond with the adjustment of the chuck jaws.

BACKGROUND OF THE INVENTION

In a clamping unit, and particularly in a chuck with exchangeable clamping jaws, one end or terminal position is reached during opening, when the clamping jaws approach the condition where stability is lost. The other end position is reached during closing, when the clamping jaws approach the point beyond which they cannot be moved further. Both end positions, however, should still be enough removed from a rest or stop position that a residual clamping stroke remains which insures safe clamping in or near the end positions. The final clamping positions differ only for chucks of different sizes, just as do the clamping strokes.

If a workpiece is to be clamped into a chuck, and the measurements of the workpiece exceed or fall short of the clamping range defined by the terminal clamping positions, proper clamping is no longer ensured, and there is the danger that when the machine starts up the workpiece or the chuck jaws will be flung away and cause damage.

For this reason, a device of the above-described type has already been developed (German published application 17 52 599) which determines whether the chuck jaws are still located within the range defined by the terminal clamping positions. If this is not the case, the machine cannot start.

In this known device, the sensors of the sensor device can be manually adjusted in relation to each other and in their spacing from a transmitter. The purpose of the adjustment is to enable adaptation to various chucks. However, it has been found in practice that faulty adjustment of the known device during a change of the chuck cannot be prevented by this device. The desired result is thereby placed in doubt.

The object of the present invention is to so improve the device of the above-described type that the safety risk is reduced and that an accidentally faulty adjustment is precluded.

SUMMARY OF THE INVENTION

The problem is solved in accordance with the invention by having at least one specific part of either the transmitter or the sensor, the two elements which determine the terminal clamping positions, associated directly with each clamping unit and by making them exchangeable with or adaptable to each clamping unit.

Preferably, the exchangeable part or parts also enable adjustment of the terminal clamping positions by altering the base spacing between the transmitter device and the sensor device, in the sense of reducing the length of the clamping stroke.

The invention thus relieves the operator of the machine from having to decide in what direction the sensors or the transmitters must be placed when the chuck unit is changed, since such decisions may be erroneous. Instead, adaptation of the apparatus to a newly exchanged chuck unit should merely consist of a standard exchange of one or several parts, or should be altogether automatic. A subsequent adjustment in the sense of a reduced length of clamping stroke is permissible, since it does not involve any safety risk. The adjustment also enables the selection of a quite specific clamping stroke which is within the limits of safety. The clamping stroke can be adapted to the measurements of a standardized tool produced repetitively, to ensure the shortest possible clamping paths and thereby the lowest possible time used for clamping and releasing. Limitation of the maximal clamping position can further insure that the steplike sections of the clamping jaws form an abutment when a workpiece is introduced into the chuck.

Starting from the previously known apparatus, which is equipped with a power-actuated displaceable carrier rod for a transmitter element and with two guides extending parallel with the carrier rod, each of the guides carrying a sensor which is displaceable thereon, one embodiment of the apparatus in accordance with the invention comprises exchangeable abutment elements for each guide, the transmitter element being longer than the spacing of the sensors measured longitudinally of the rod when the sensors are in abutting position, operation of the machine tool starting only upon response of both sensors. In further development of this embodiment, the associated sensors can be moved relatively to the abutment elements of the two guides so as to reduce the length of the clamping stroke.

The guides may, in known manner, be formed of guide rods. In this case, in a further development of this first embodiment the abutment elements may be formed by the shoulders of radially stepped sleeves which are mounted on the guide rods, the sensors being displaceably disposed on the narrower portion of these sleeves.

To prevent the sleeves from being pushed onto the wrong guide rods, it is further proposed that either the sleeves or the guide rods be provided with locking means which exclude sliding of a sleeve over a guide rod not associated with it.

Starting again from the known device with its power-driven displaceable carrier rod for a transmitter element and with its two sensors disposed longitudinally of the path of movement of the transmitter element, a second embodiment provides a transmitter element longer than the spacing of the sensors measured longitudinally of the rod, the transmitter element being exchangeable so that a particular transmitter element of a specific base length is associated with each clamping unit, the machine tool being started only upon proper response of both of the two sensors.

In a practical form of the second embodiment, the transmitter element may comprise two parts disposed in series longitudinally of the carrier rod and interlocking telescopically, the two parts being movable toward each other from a position of bare overlap, so as to shorten the transmitter element in order to reduce the clamping stroke, if and when that be desired.

A third embodiment of the invention starts out from the features of the known device, in which a power-driven displaceable carrier rod carries a transmitter element and a sensor device with two sensors is disposed longitudinally of the path of movement of the transmitter elements, the transmitter device being shorter than the space between the sensors, the machine tool being started only if there is no response from either of the two sensors. This third embodiment may have a particular sensor device with a specific spacing between the sensors associated with each chuck unit and exchangeable therewith. In accordance with a form of this third embodiment, it is possible, in order to reduce the clamping stroke, to adjust the sensors in relation to each other out of an abutting position.

In a fourth embodiment, again using the known apparatus which is provided with a power-driven displaceable carrier rod for the transmitter device and with two sensors disposed longitudinally of the path of movement of the transmitter device, the transmitter device is shorter than the space between the sensors, and a particular transmitter device of a specific length is associated with each clamping unit and is exchangeable therewith, the machine tool being started only if there is no response from either of the two sensors. To reduce the clamping stroke in the fourth embodiment, the transmitter device may be adjustable in the sense of extension out of the position of abutment.

In all four above-described embodiments at least one specific part of either the transmitter device or the sensor device is to be changed with each change of the clamping unit.

The invention also includes an automatic device for an apparatus with a power-driven displaceable carrier rod for a transmitter element and the two sensors disposed longitudinally of the path of movement of the transmitter elements; however, this automatic device incorporates further sensors disposed along the path of movement, two specific sensors being respectively activated for each change of clamping unit. For this purpose, each clamping unit may be provided with a code transmitter whose code is read by a code reader, which in turn controls a selection circuit for the sensors. The sensors may be disposed concentrically about the carrier rod. Thus, for example, the carrier rod may be axially displaceable in a cylindrical drum. Holders for the sensors may be secured on the drum.

Starting from a known device for adjusting two end positions limiting a clamping stroke of the power-actuated chuck jaws of an exchangeable workpiece-clamping unit of a machine tool and for determining the attainment of the end positions, a further form of the invention is proposed which is independent of the preceding forms of the invention. This embodiment combines a true-value transmitter of the clamping position adjusted along with the adjustment of the clamping jaws, a desired value-transmitter for the widest and narrowest clamping positions, and a comparator connected with the true-value transmitter and the desired-value transmitter and generating a locking signal for the machine tool when conformity between the desired value and the true value has been established. This embodiment is particularly suitable for a machine tool with digital control.

In further development of this embodiment each clamping unit may be equipped with a code transmitter whose code is read by a code reader, a true-value code being emitted by a programming control for the machine tool, and a further comparator being provided which compares the code read by the reader with the true-value code and generates a locking signal for the machine tool, if there is a discrepancy between the two.

The true-value transmitter for the clamping position may be a linear sensing device coupled with a piston-cylinder power drive and operating as a contactless transmitter-sensor device. The true value of the clamping position is well suited for evaluation as the test value for the workpiece.

Embodiments of the invention are described hereinbelow in connection with the drawings.

DESCRIPTION OF SOME PREFERRED EMBODIMENTS OF THE INVENTION

Figure 1:
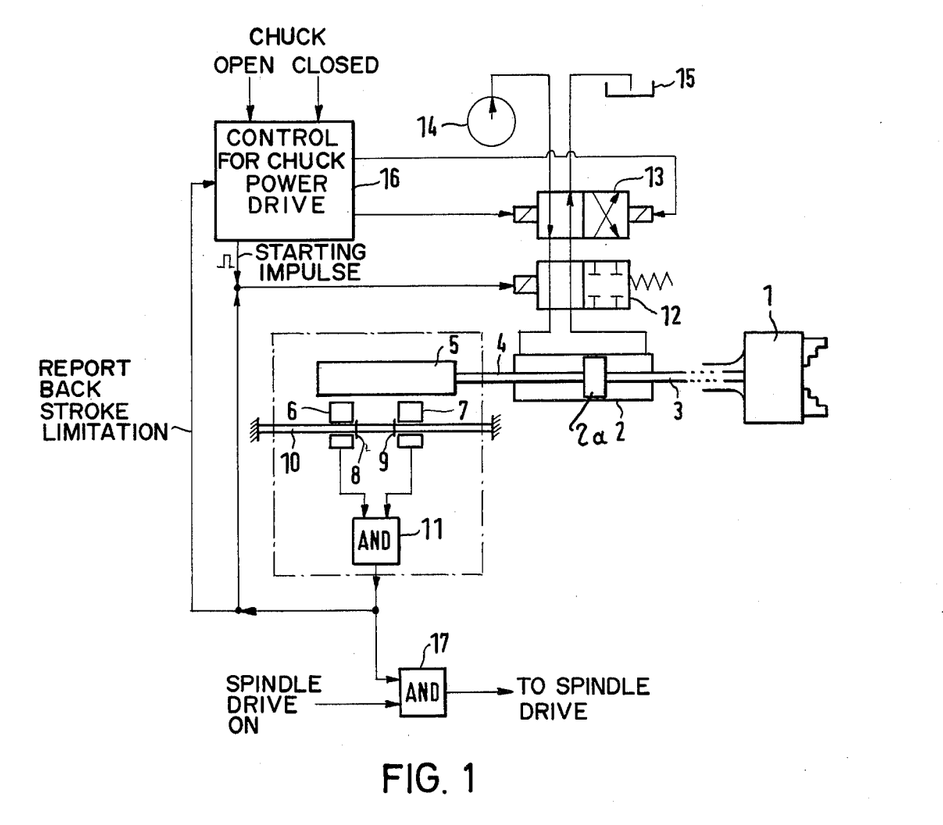
FIG. 1 is a diagrammatic representation of a machine tool and controls for its chuck in accordance with the principles of the invention; certain parts of the device are framed by a dot-dash rectangle.

FIG. 1 shows the clamping unit or chuck 1 of a turning machine or lathe. A clamping cylinder 2 enables adjustment of the jaws of the chuck 1 and its piston 2a is connected with the chuck 1 by a piston rod 3. A rod 4 extends to the other side of the piston 2a and is connected to a cylindrical transmitter 5. Two sensors 6 and 7 are disposed within the range of movement of the transmitter 5. The two sensors 6 and 7 are movable along a rod 10, and the range of their movement is limited by two abutments 8 and 9. The two sensors 6 and 7 may be moved away from each other and away from the positions of abutment; they are electrically connected to an AND gate circuit.

The cylinder 2 is supplied with a pressure medium via two valves 12 and 13 which are disposed in series with each other. The pressure medium is supplied by a pump 14, and a return line conveys the pressure medium to a sump 15. The valve 12 is normally in closed position. Only when both sensors 6 and 7 respond to the transmitter 5 does the AND gate 11 generate a signal for opening the valve 12. Such a signal (provided the valve 13 is open) effectuates displacement of the cylinder 2. The direction of movement of the cylinder 2 is determined by a displacement signal emitted by a control device 16 for the power drive of the chuck 1. The AND gate 11 reports back to the control 16 when the prescribed displacement stroke has been exceeded, and the valve 12 is moved to its closed position. When the power drive is again to be started up, the control 16 transmits an impulse to open the valve 12.

When the clamping jaws of the chuck 1 are in their "closed" end position, the piston 2a of the cylinder 2 is in its farthest right position. In this "closed" end position the sensor 6 responds to the left end of the transmitter 5. The sensor 7 is located opposite the central area of the transmitter 5 and also responds. When the piston 2a and the transmitter 5 are moved to the left, to move the chuck 1 to the "open" end position, the sensor 7 responds to the right end of the transmitter 5.

The output signal of the AND gate 11 is also transmitted to an input of a further AND gate 17; the starting signal for the spindle drive is transmitted to the other input of the gate 17. The output of the AND gate 17 leads to the spindle drive. This circuitry insures that the spindle drive can be started only when the chuck jaws are located within the prescribed range of stroke, that is, when the transmitter 5 does not move out of the response range of either of the sensors 6 and 7.

If it is desired that the chuck not move all the way to its "open" terminal position each time a tool is introduced, the clamp-opening stroke can be reduced by moving the sensor 7 to the right along the rod 10.

When the chuck 1 is exchanged for one having different end positions, the apparatus is adapted to this newly exchanged chuck by changing the abutments 8 and 9 for other abutments. How this can be practically done is explained in connection with FIGS. 6 to 8.

Figure 2:
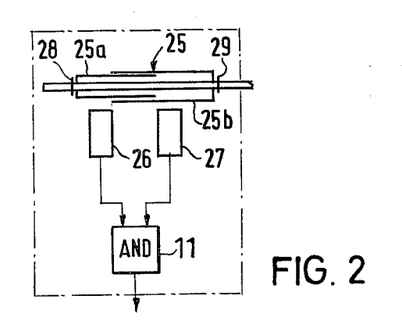
FIGS. 2-4 are diagrams of three further embodiments of the certain parts of FIG. 1 framed by dot-dash lines.

In the embodiment illustrated in FIG. 2, the movable sensors 6 and 7 are replaced by fixed sensors 26 and 27, and a different transmitter 25 is used, comprising two sleeves 25a and 25b movably disposed on the rod 4 and interlocking telescopically. The end positions of the two sleeves 25a and 25b are determined by abutments 28 and 29. When the chuck 1 is changed, the abutments 28, 29 are also changed. As shown in connection with FIGS. 9 and 10, it is, however, also possible to change the sleeves 25a, 25b, the lengths of the sleeves being varied from unit to unit.

Figure 3:
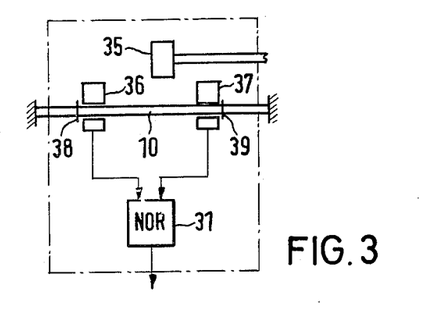

In the embodiment of FIG. 3, a short transmitter element 35 is secured on the rod 4. Sensors 36 and 37 are displaceably mounted on the rod 10. The displacement ranges of the sensors 36, 37 are limited by abutments 38 and 39. The abutments 38 and 39 permit displacement of the sensors 36 and 37 in relation to each other. The valve 12 is opened when neither of the two sensors 36 and 37 responds. For this purpose, the two sensors 36 and 37 are connected to a NOR gate 31 which controls the valve 12. The sensor 37 determines the "closed" terminal clamping position. When the chuck 1 is changed, the abutments 38, 39 are also changed.

Figure 4:
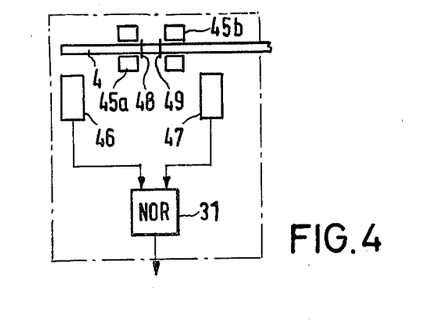

In the embodiment in accordance with FIG. 4, two sensors 46 and 47 are again mounted in fixed positions. Two transmitter elements 45a and 45b are displaceably disposed on the rod 4. Movement of the two transmitter elements 45a and 45b is limited by abutments 48 and 49 disposed between them. When the two transmitter elements 45a and 45b are adjusted, their spacing can be increased. The sensor 47 determines the "closed" end position, while the sensor 46 determines the "open" end position. When the chuck 1 is changed, the transmitter elements 45a and 45b would have to be changed for other transmitter elements of a different length. If necessary, the abutments 48 and 49 are also changed.

Figure 5:
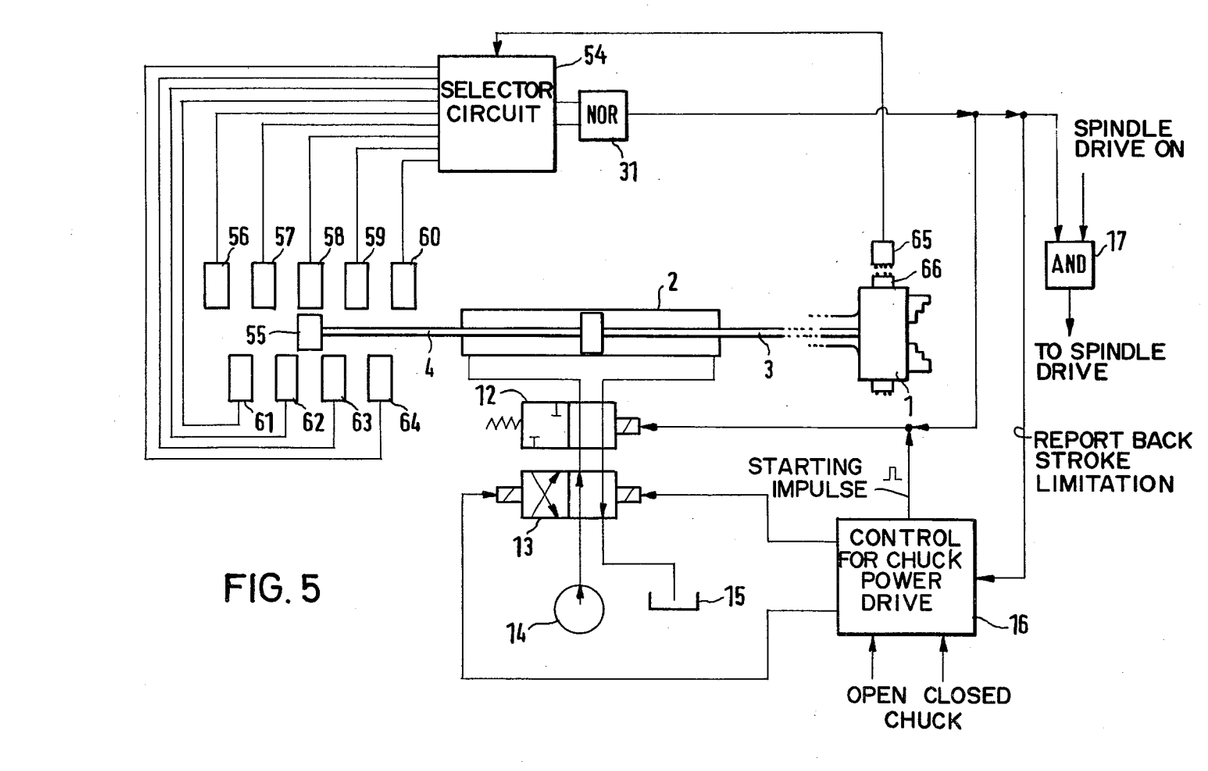
FIG. 5 is a diagram of a modified embodiment of the invention enabling automatic operation.

In an automatic version, illustrated in FIG. 5, a short transmitter element 55 is secured on the rod 4. A plurality of fixed sensors 56, 57, 58, 59, 60, 61, 62, 63 and 64 are located in the range of movement of the transmitter element 55. These sensors are each connected with a selector circuit 54. A code transmitter 66 is provided on each chuck 1 and has contacts mating with those on a code reader 65. The code reader 65 supplies the selector circuit with a signal corresponding to the read code. The selector circuit 54 selects two of the sensors 56, 57, 58, 59, 60, 61, 62, 63 and 64 corresponding to the read signal and transmits the signals supplied by the sensors to the NOR gate 31, which controls, as described, the valve 12. Thus, a physical change of sensors need not be made. The sensors associated with the respective chuck 1 are here automatically both selected and made to function. A practical realization is described hereinbelow in connection with FIGS. 11 to 13. The remaining circuit components correspond to those of FIG. 1.

Figure 6:
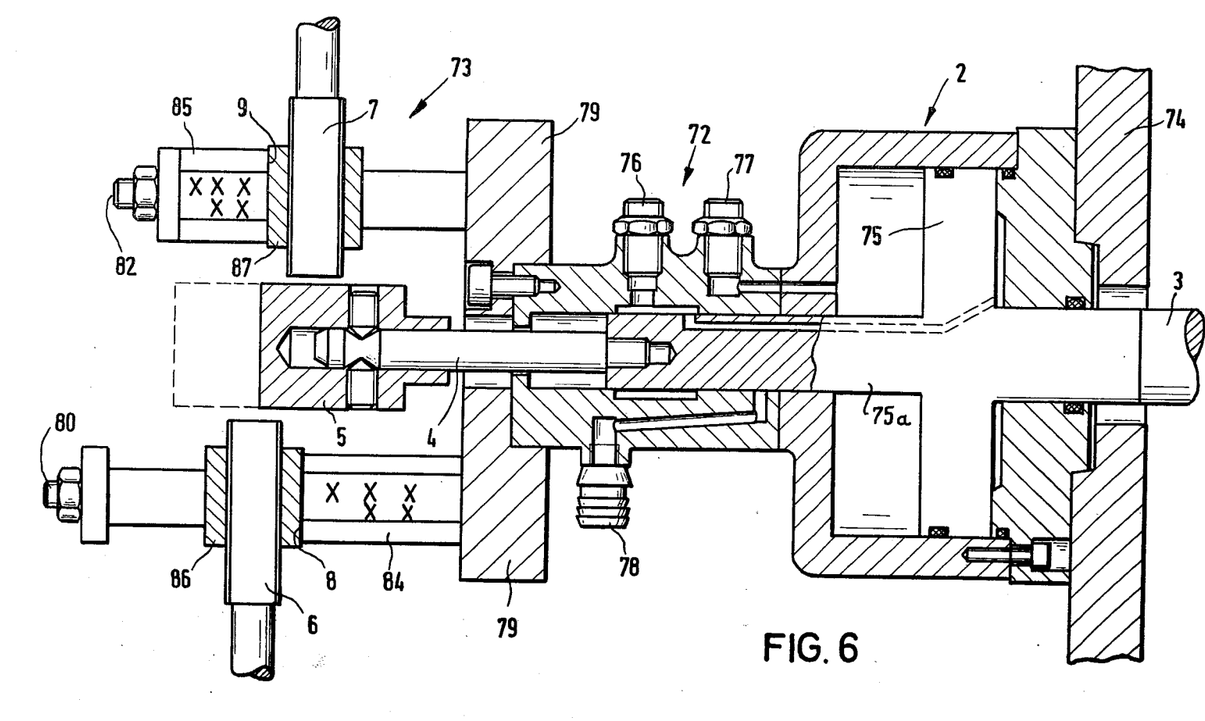
FIG. 6 is a longitudinal section, taken along the line VI—VI in FIG. 7, through a clamping cylinder having a monitoring device in accordance with the embodiment of FIG. 1.

FIG. 6 shows a power chuck cylinder 2, a pressure medium distributor 72 and a monitoring device 73. The cylinder 2 is attached indirectly to the wall 74 of a spindle housing. The cylinder 2 has a piston 75 connected on one side with the chuck 1 of FIG. 1 via a pull rod 3; an extension 75a on the other side of the piston 75 projects into a housing of the distributor 72, through which the pressure-medium is conducted to the cylinder 2. This type of pressure-medium distributor 72 is known and is therefore indicated merely schematically; it has pressure-medium connections 76 and 77 for pressurizing and depressurizing, respectively, as well as, if desired, a leakage oil conduit 78.

A rod 4 is screwed into the extension 75a of the piston 75 at a location inside the distributor housing 72; it projects out of the housing 72 and is fixedly secured to the transmitter 5. A holding plate 79 is secured to the distributor 72 and carries two pairs of guide columns 80, 81 and 82, 83 (see FIG. 7). A recessed or stepped sleeve 84 or 85 is drawn over each of the guide columns 80 and 82 and carries in turn a sensor holder 86 or 87. As will be seen in FIGS. 7 and 8, the sensor holders 86 and 87 are slit in two places, so that they can be clamped onto the thinner sections of the sleeves 80, 82, and the sensors 6 and 7 can be clamped into them. The shoulders of the stepped sleeves 80 and 82 form the abutments 8 and 9 for the sensor holders 86 and 87.

Figure 7:
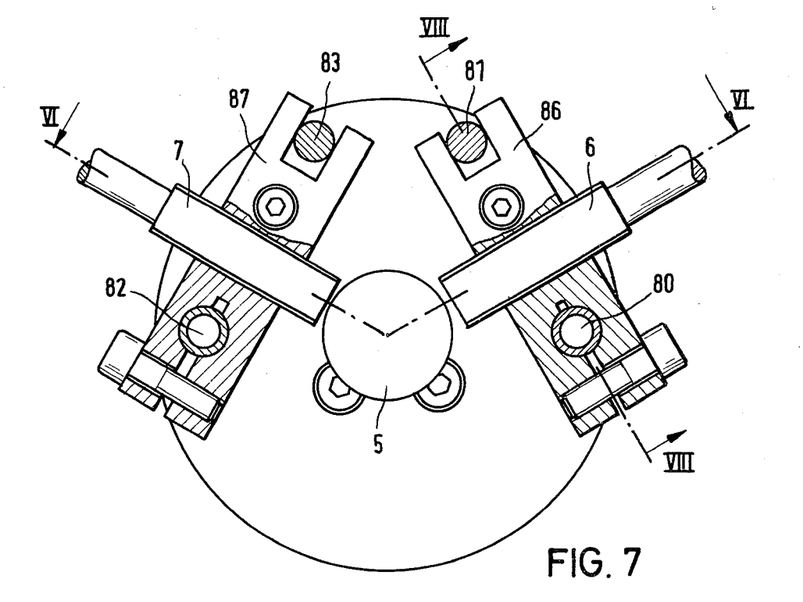
FIG. 7 is an end view looking from the left of the device shown in FIG. 6.

In FIG. 7, it is further shown that the sensor holders 86 and 87 are supported against torsion by the second guide columns 81 and 83, respectively. In the illustrated example, the sensors 6 and 7 are disposed vertically to the guide columns 81 and 83.

Figure 8:
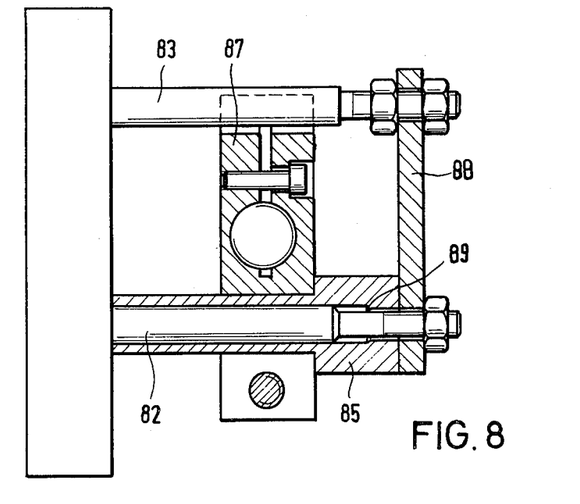
FIG. 8 is a section taken along the line VIII—VIII in FIG. 7.

In accordance with FIG. 8, the two guide columns 80, 81 and 82, 83 of each pair are stiffened by a crosspiece 88 which simultaneously fixes the sleeve 85 in its position. In FIG. 8, a radial offset 89 is also shown which prevents faulty application of the sleeve 85 over the guide column 82. Each set of sleeves 84, 85 corresponds to a particular chuck 1.

To set up a chuck 1 on a new workpiece, a sample piece is clamped into the chuck. The sensor 6 is then displaced by means of its holder 86 so that it still just responds to the transmitter 5. The sensor 7 is then adjusted so that the chuck 1 offers a sufficient opening for introduction of the workpiece. As a rule, a full stroke up to the end position will be used for opening the chuck 1. However, a shorter stroke can be selected with the sensor 7. The sensor 7 then causes the pressure medium feed conduit to close and simultaneously prevents the machine spindle from starting up. If both sensors 6 and 7 respond, the clamping operation is satisfactory, and the spindle can start up. As soon as one of the sensors 6, 7 is de-energized, the drive of the spindle is locked. Each sensor holder 86, 87 can now be moved only as far as the shoulders 8, 9 of the sleeves 84, 85 being used. The shoulders 8, 9 delimit the admissible clamping range of the associated chuck 1. Displacement of the sensor holder 86, 87 away from the shoulders 8, 9 of the sleeves 84, 85 reduces the clamping stroke and cannot therefore impair reliability.

Figure 9:
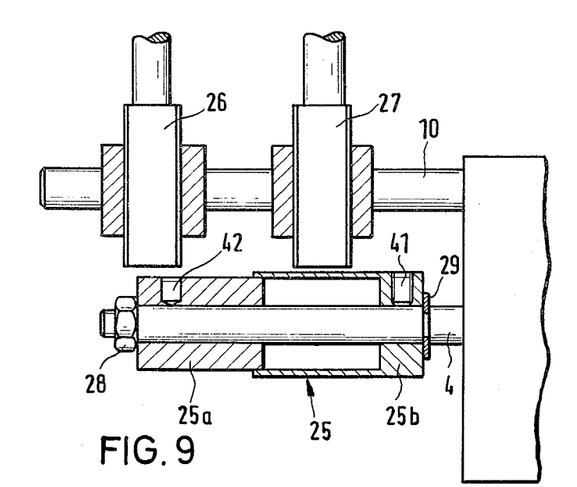
FIG. 9 is a fragmentary view in section of a portion of the device corresponding to the embodiment of FIG. 2.
Figure 10:
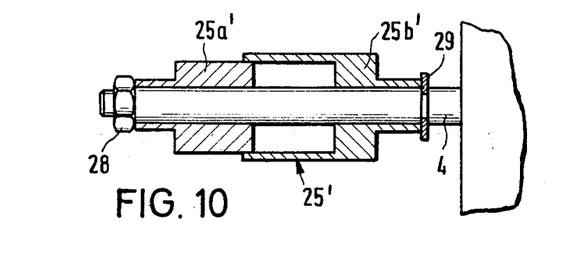
FIG. 10 is a fragmentary view like the lower portion of FIG. 9, but with a different transmitter.

The embodiment shown in FIGS. 9 and 10 corresponds to the schematic representation of FIG. 2. It speaks for itself, and it should merely be added that the telescopically interlocking sleeves 25a and 25b are releasably secured on the rod 4 by means of setscrews 41 and 42. One abutment 28 is a nut, and the other is a "circlip" type of lock washer. The exchanged transmitter element 25' in FIG. 10 comprises two offset sleeves 25a' and 25b'. The narrowness of the transmitter element 25' in FIG. 10, which is effective for the action of the sensors, is less than that of the transmitter element 25 in FIG. 9.

Figure 11:
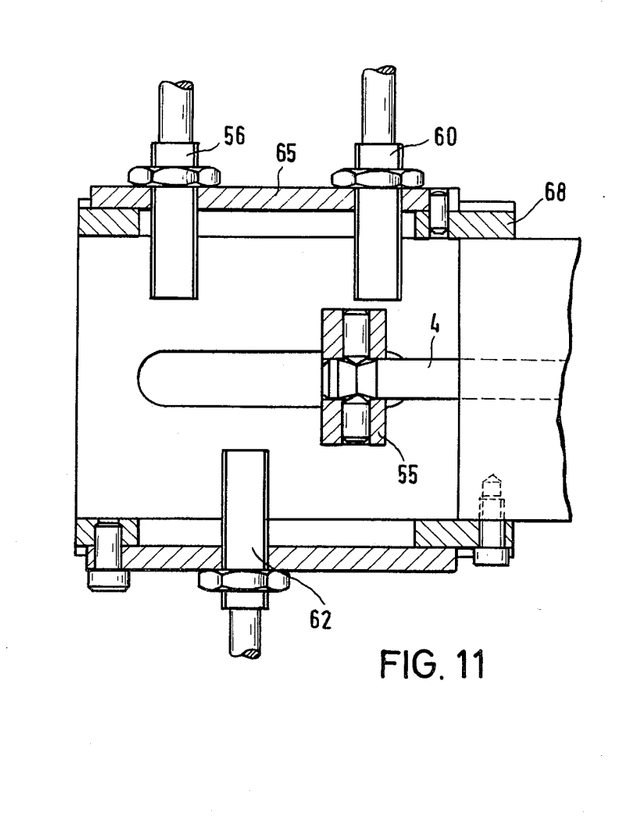
FIG. 11 is a view in longitudinal section through a device of the automatic embodiment of FIG. 5.
Figure 12:
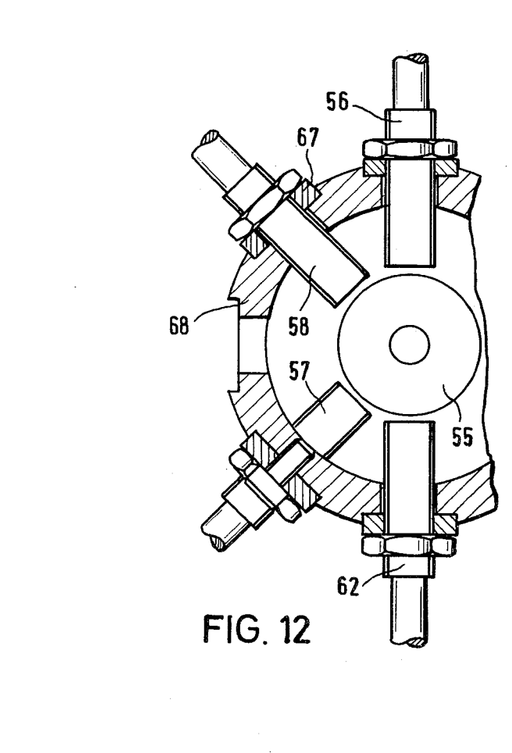
FIG. 12 is a cross-section through FIG. 11.
Figure 13:
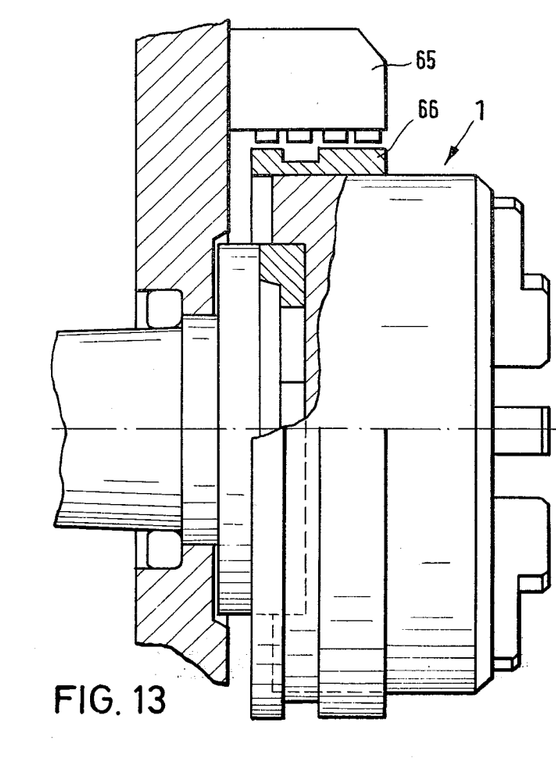
FIG. 13 is a view, partly in section, of a chuck with a code transmitter as well as a code reader, as in FIG. 5, for the automatic version.

The embodiment of FIGS. 11 to 13 corresponds to the schematic representation in FIG. 5. It will be seen that the sensors 56 through 64 are secured on holders 67. The sensor holders 67 are in turn secured on a drum 68 and concentrically surround the axis of the drum 68. The rod 4, extending along the axis of the drum 68, carries the transmitter 55.

FIG. 13 shows a chuck 1 on an enlarged scale. In particular, the code transmitter 66 and the code reader 65 (of FIG. 5) are here well recognizable. The code transmitter 66 is in the form of a ring which concentrically surrounds the chuck 1.

Figure 14:
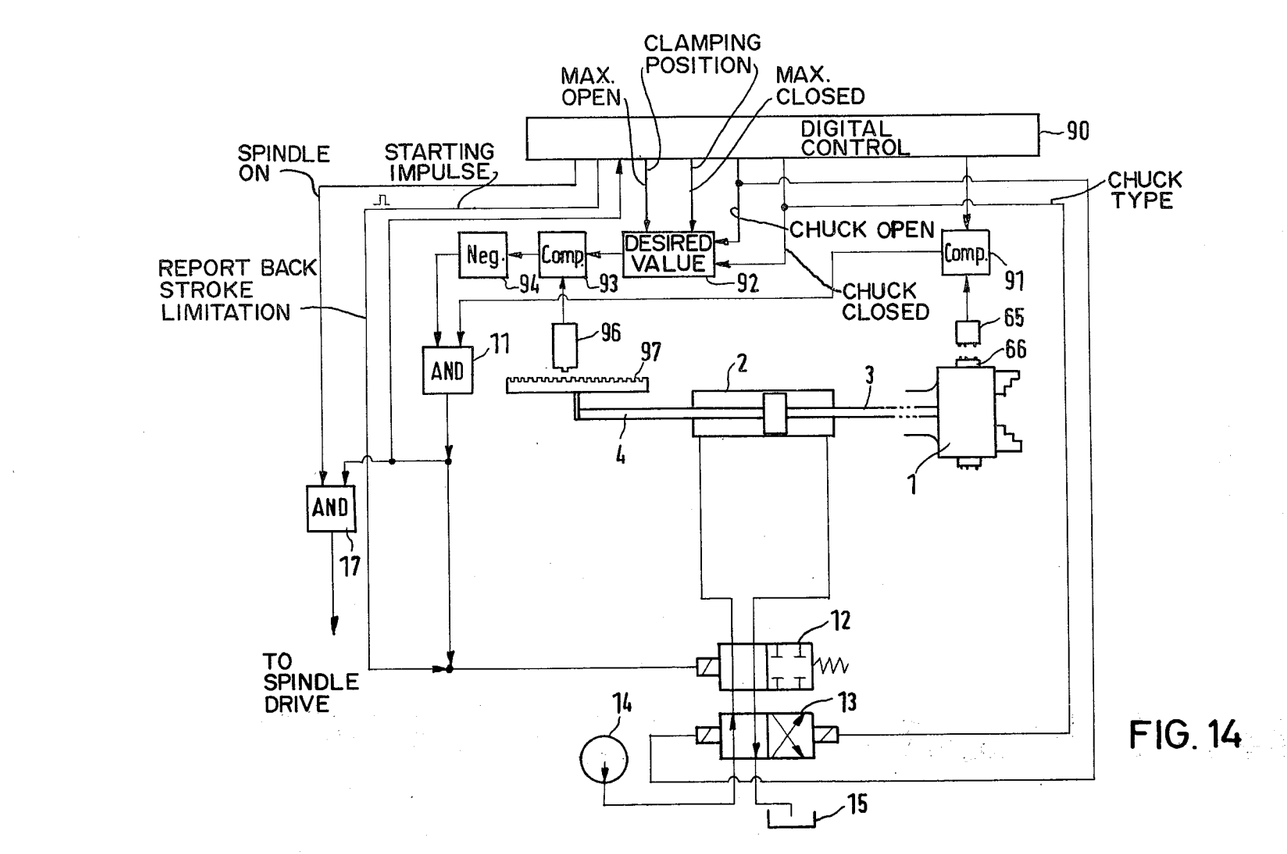
FIG. 14 is a diagram of a system of the invention operating with digital control.

In FIG. 14, the rod 4 is connected with a position indicator 97 which is scanned by a sensor 96. A digital control 90 transmits to a desired-value selection circuit 92 the two stroke-limitation values for the chuck 1. The digital control 90 further produces signals for controlling the direction of displacement of the power drive to the valve 13. These signals are fed to the desired-value selection circuit 92. Depending on whether the chuck 1 is to be opened or closed, the circuit 92 passes on only the value for the maximal or only the value for the minimal clamping position to a comparator 93 to which the actual value position of the chuck is also supplied by the sensor 93. If the comparator 92 determines conformity, it emits a signal, which is transmitted to a negator 94, at whose output a signal appears when no signal appears at its input. The digital control 90 emits a chuck-type set-point signal which is compared with the chuck-type set-point signal read by the code reader 66. If there is conformity, the further comparator 91 emits a signal to one of the inputs of the AND gate 11 whose other input receives the signal generated by the negator 94. Thus the AND gate 11 here generates an opening signal for the valve 12 when the chuck in the machine corresponds to that prescribed by the digital control 90 and when the clamping jaws are within the prescribed range of stroke. The other circuit elements are the same as in FIG. 1.

In conclusion, it should be mentioned that the above-described electric and pneumatic circuit elements are intended merely to clarify the basic principle of the invention.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. Apparatus for adjusting two end positions limiting a clamping stroke of the power-actuated chuck jaws of an exchangeable workpiece-clamping unit of a mcahine tool and for determining the attainment of the end positions, comprising:

position-indicating means for indicating the actual position of the clamping position of said jaws and adjusted along with each adjustment of the clamping jaws, desired-value transmitting means for transmitting signals corresponding to said two end positions, comparator means for receiving signals corresponding to the position indicated by said position indicating means and the signals from said transmitting means and for generating a locking signal for said machine tool when conformity between one of the end positions and said actual position has been established, a code transmitter on said workpiece-clamping unit, a code reader for reading signals from the code transmitter, programming control means for emitting a set-point signal for the machine tool, and second comparator means for comparing the code read by the reader with the set-point signal and for generating a locking signal for the machine tool if there is a discrepancy between the two.

2. Apparatus in accordance with claim 1, wherein said position-indicating means comprises a piston-cylinder power drive for said clamping stroke for said jaws having a mechanical extension with position indicating calibrations and a sensor for scanning said calibrations and operating as a contactless transmitter-sensor device.

3. Apparatus in accordance with claim 1, having logic circuit means for evaluating the actual position of said workpiece-clamping unit as indicated by said code reader with that indicated by said position indicating means.

* * * * *